(12) United States Patent
Alexopoulos et al.

(10) Patent No.: US 9,083,081 B2
(45) Date of Patent: Jul. 14, 2015

(54) 3D ANTENNA ASSEMBLY WITH PROJECTED AMC AND APPLICATIONS THEREOF

(71) Applicant: BROADCOM CORPORATION, Irvine, CA (US)

(72) Inventors: Nicolaos G. Alexopoulos, Irvine, CA (US); Seunghwan Yoon, Costa Mesa, CA (US)

(73) Assignee: Broadcom Corporation, Irvine, CA (US)

( * ) Notice: Subject to any disclaimer, the term of this patent is extended or adjusted under 35 U.S.C. 154(b) by 405 days.

(21) Appl. No.: 13/720,716

(22) Filed: Dec. 19, 2012

(65) Prior Publication Data

US 2013/0252561 A1 Sep. 26, 2013

Related U.S. Application Data

(63) Continuation-in-part of application No. 13/037,051, filed on Feb. 28, 2011, which is a continuation of application No. 13/034,957, filed on Feb. 25, 2011.

(60) Provisional application No. 61/614,685, filed on Mar. 23, 2012, provisional application No. 61/731,676, filed on Nov. 30, 2012, provisional application No. 61/322,873, filed on Apr. 11, 2010.

(51) Int. Cl.
*H01Q 19/12* (2006.01)
*H01Q 15/00* (2006.01)
*H04B 1/40* (2015.01)
*H01Q 9/27* (2006.01)

(52) U.S. Cl.
CPC ............. *H01Q 15/0086* (2013.01); *H01Q 9/27* (2013.01); *H01Q 15/0066* (2013.01); *H04B 1/40* (2013.01)

(58) Field of Classification Search
CPC . H01Q 15/0086; H01Q 15/0066; H01Q 9/27; H01Q 1/40; H04B 1/40
USPC ..................... 343/840, 781 R, 781 P, 781 CA
See application file for complete search history.

(56) References Cited

U.S. PATENT DOCUMENTS 5,777,572 A * 7/1998 Janusas ........................... 342/13
6,483,474 B1 * 11/2002 Desargant et al. ...... 343/781 CA
2012/0212395 A1 * 8/2012 Sanada .......................... 343/912

* cited by examiner

*Primary Examiner* — Hoanganh Le
(74) *Attorney, Agent, or Firm* — Garlick & Markison; Bruce E. Garlick

(57) ABSTRACT

An antenna assembly a spiral antenna feed and a programmable circuit. The spiral antenna feed includes a substrate, a spiral antenna element, and a feed point. The substrate has a three-dimensional hyperbolic shaped region, which supports the spiral antenna element such that the spiral antenna has an overall shape approximating a three-dimensional hyperbolic shape. The feed point is coupled to a connection point of the spiral antenna element. The programmable circuit produces a projected artificial magnetic conductor reflector dish that reflects an inbound RF signal to the spiral antenna feed and reflects an outbound RF signal from the spiral antenna feed.

20 Claims, 12 Drawing Sheets

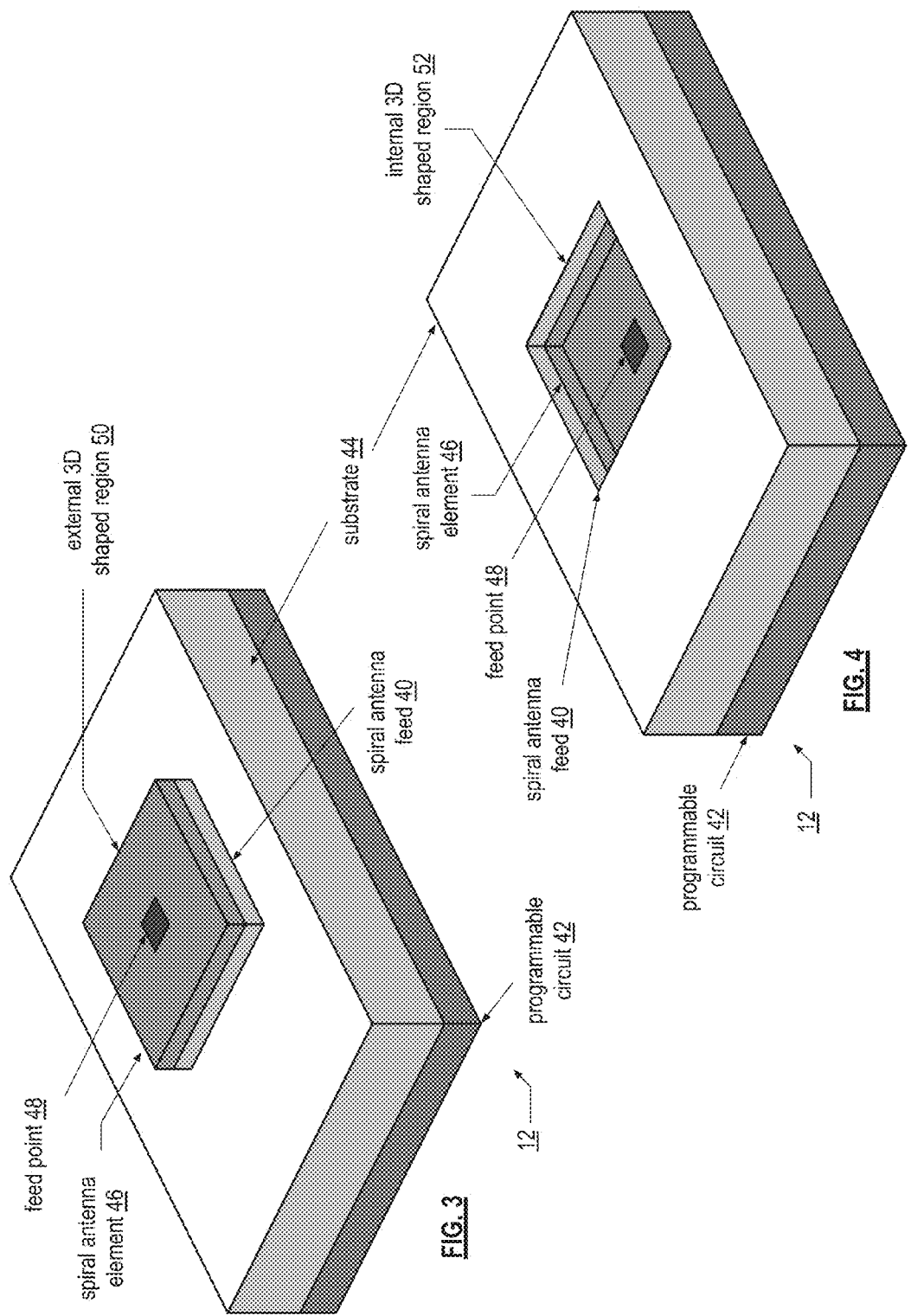

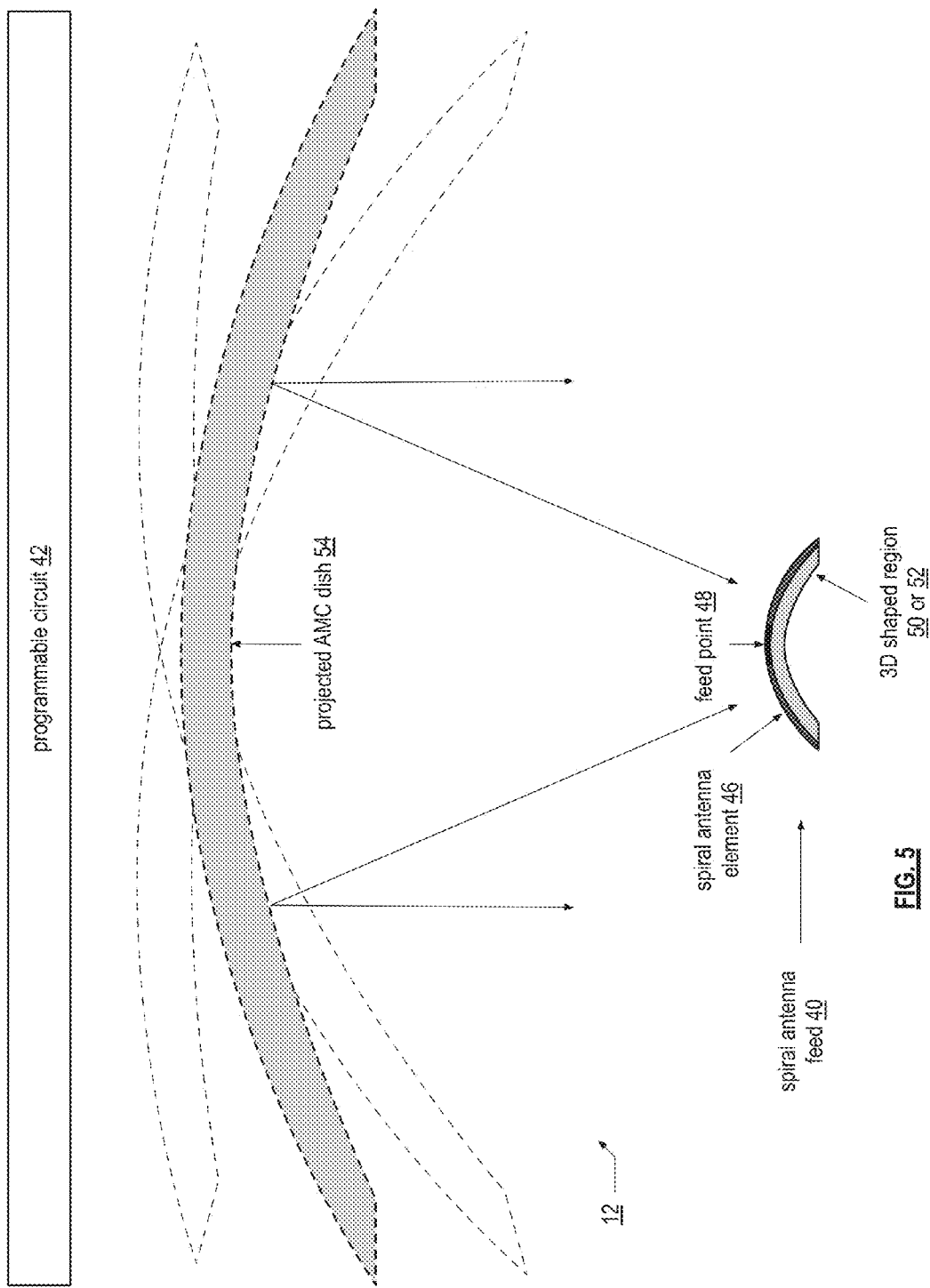

spiral antenna element 46 spiral antenna element 46 symmetric spiral pattern 60
46 eccentric spiral pattern 62
46

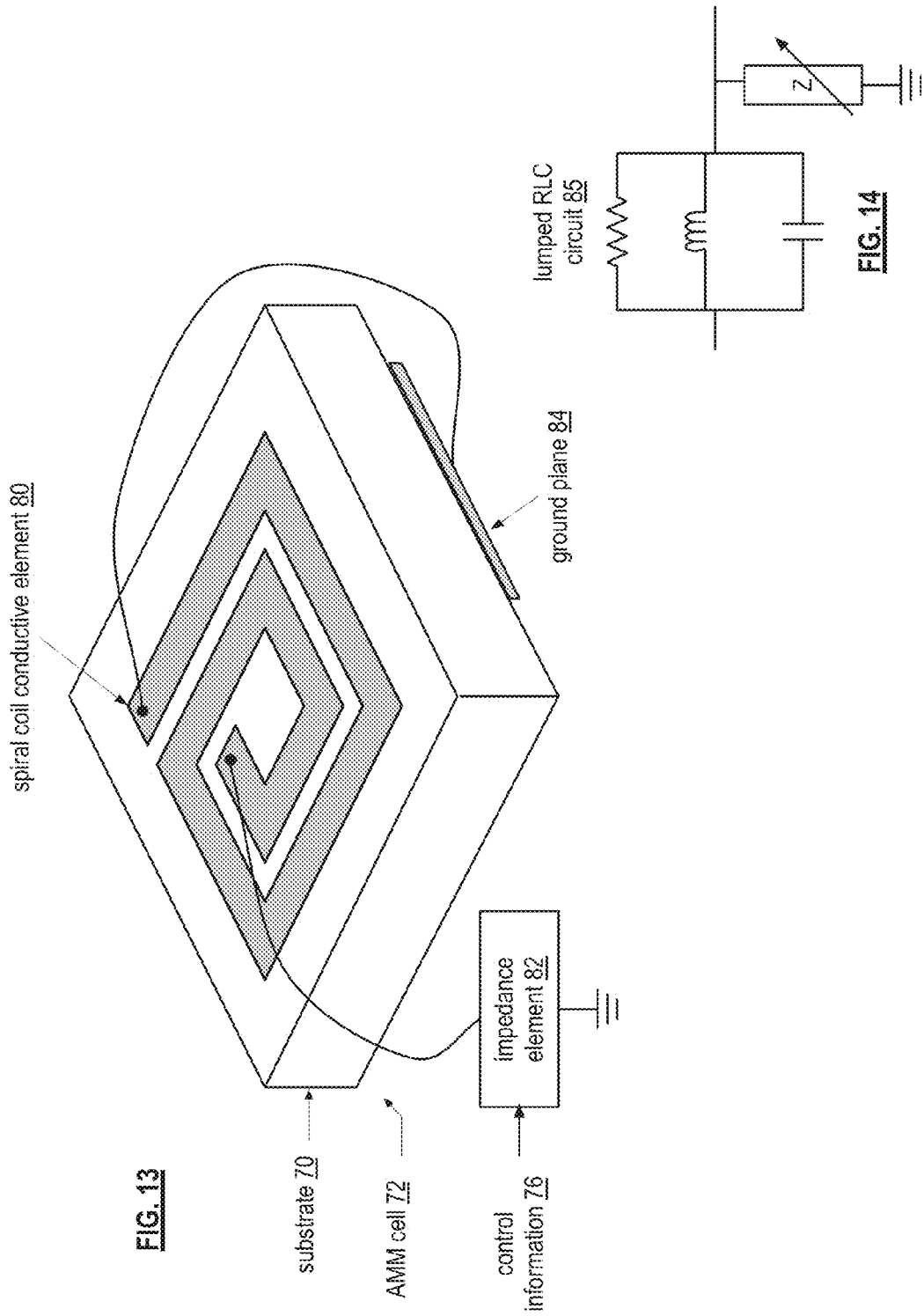

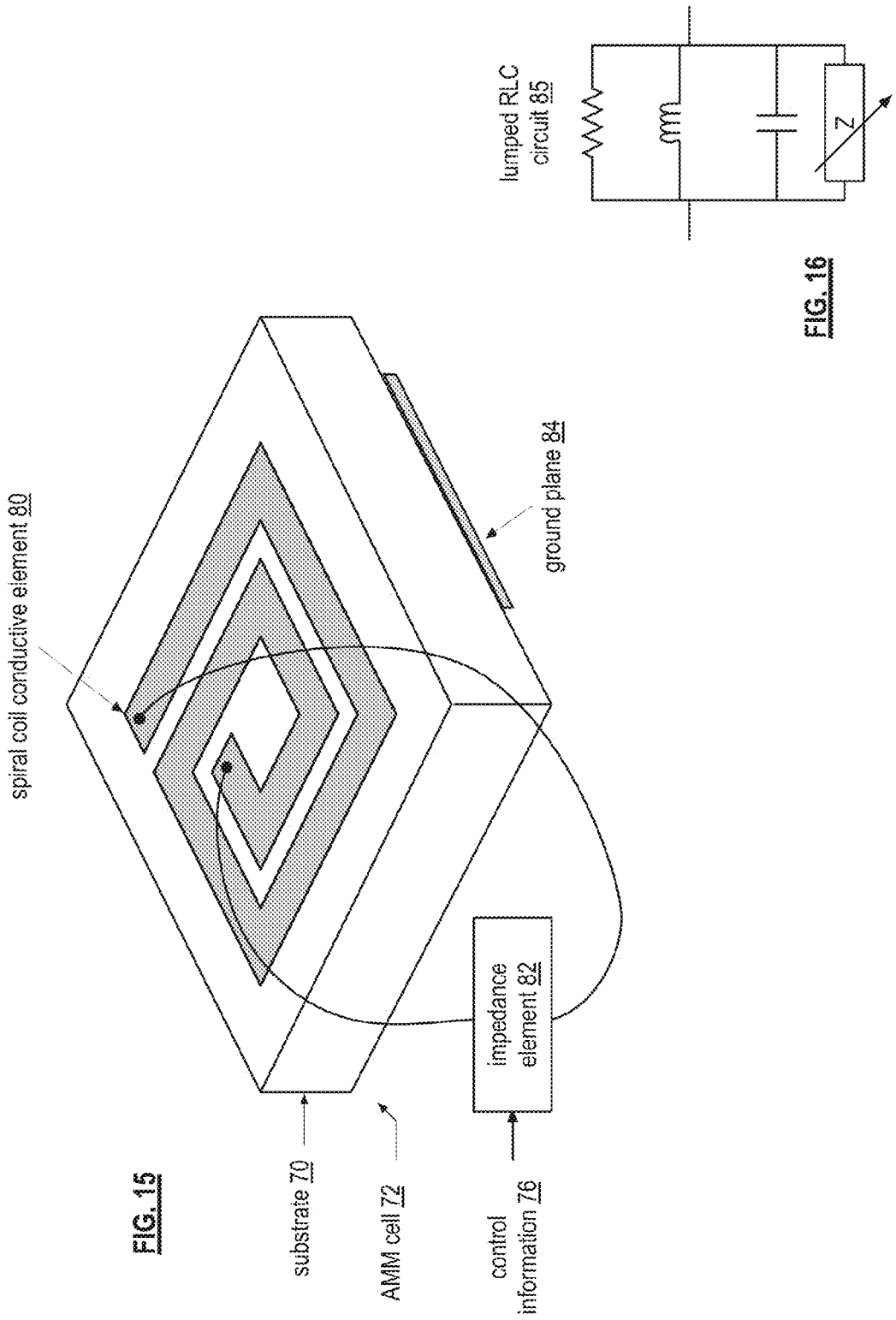

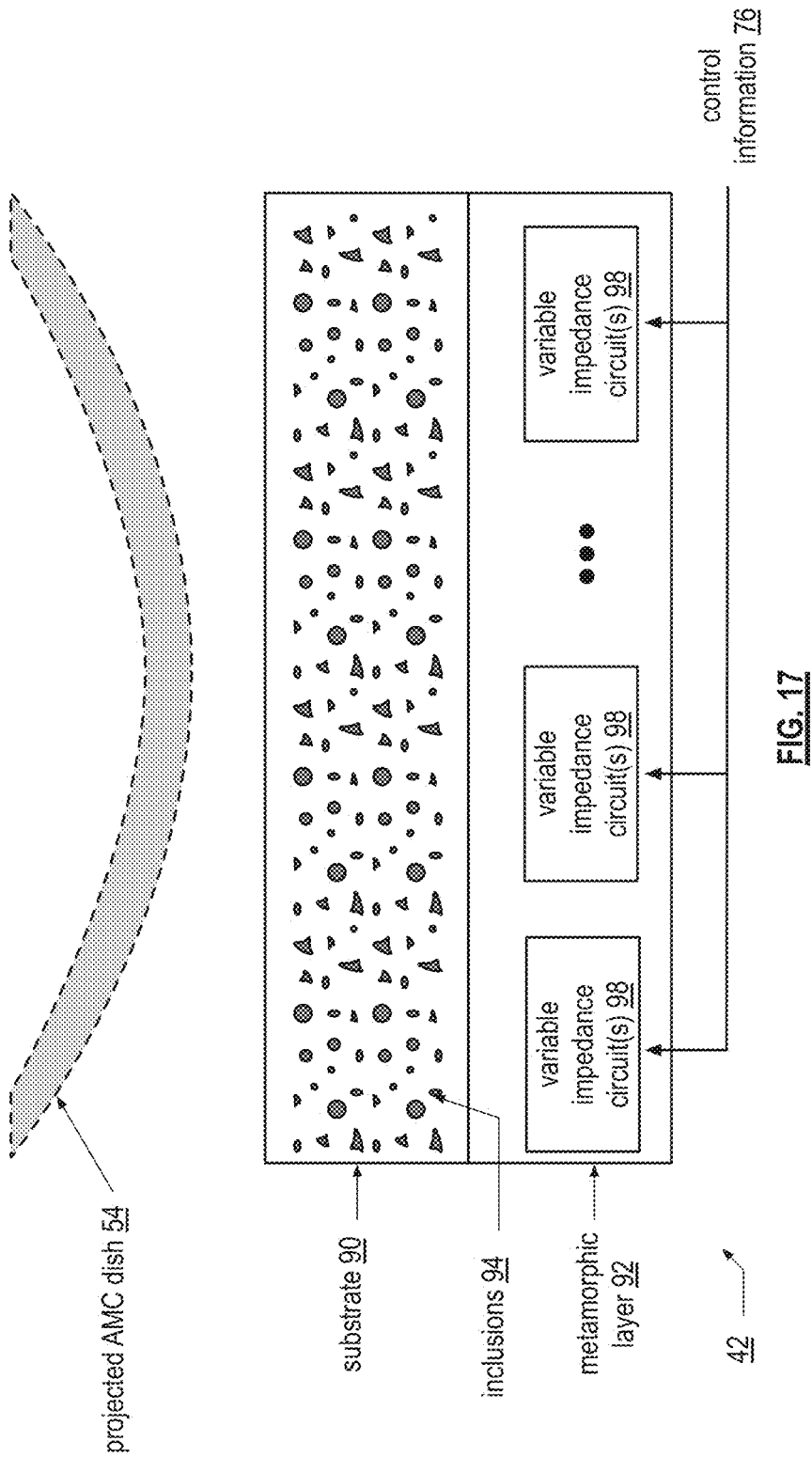

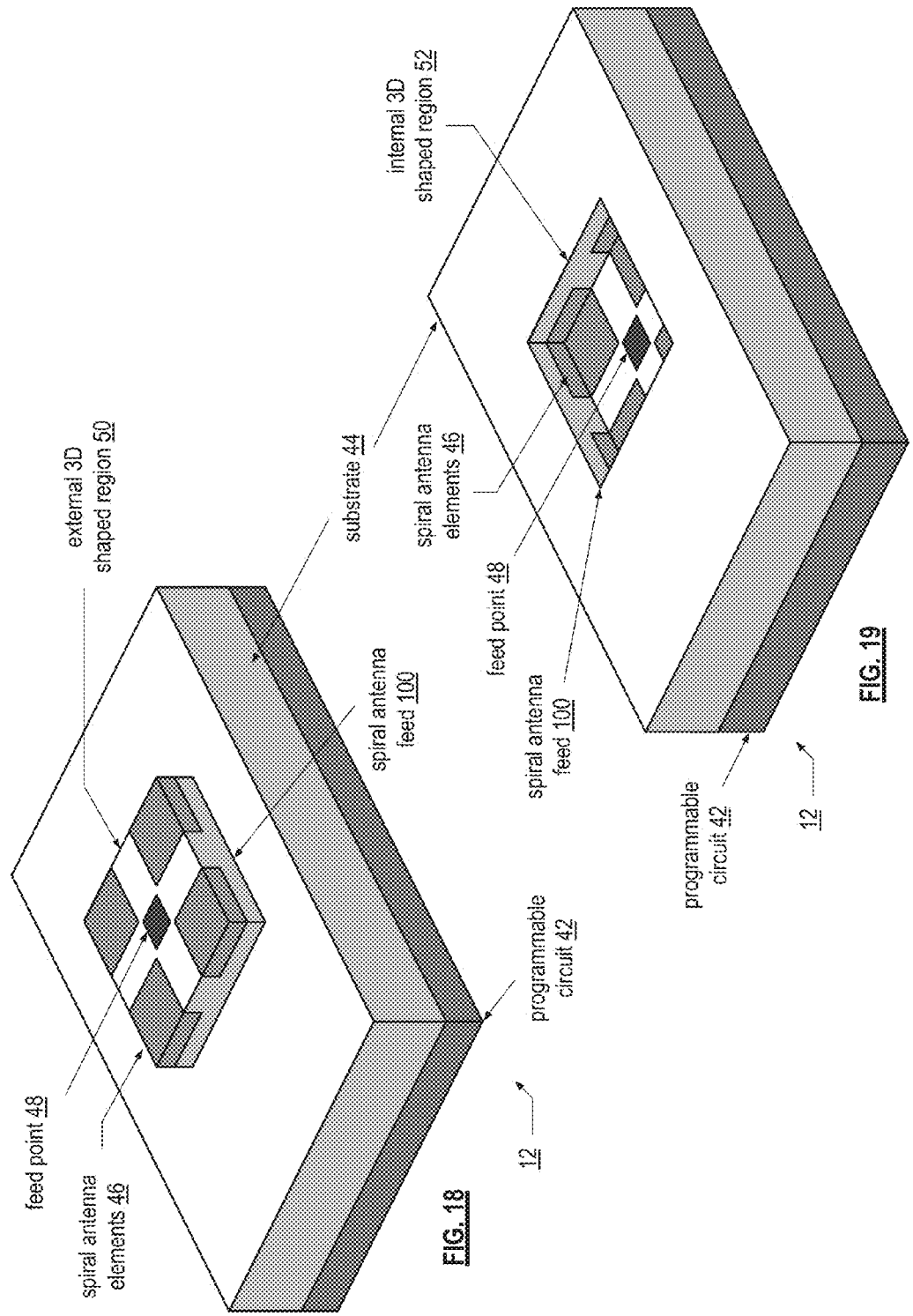

… … …

3D ANTENNA ASSEMBLY WITH PROJECTED AMC AND APPLICATIONS THEREOF

CROSS REFERENCE TO RELATED PATENTS

The present U.S. Utility patent application claims priority pursuant to 35 U.S.C. §119(e) to the following U.S. Provisional applications which are incorporated herein by reference in their entirety and made part of the present U.S. Utility patent application for all purposes:
1. U.S. Provisional Application No. 61/614,685, entitled "Parabolic Interwoven Assemblies and Applications Thereof," filed Mar. 23, 2012, and
2. U.S. Provisional Application No. 61/731,676, entitled "3D Antenna Assembly with Projected AMC and Applications Thereof," filed Nov. 30, 2012.

This patent application is further claiming priority under 35 USC §120 as a continuation-in-part patent application of co-pending patent application entitled RF AND NFC PAMM ENHANCED ELECTROMAGNETIC SIGNALING, having a filing date of Feb. 28, 2011, and an application number Ser. No. 13/037,051 which claims priority under 35 USC §120 as a continuing patent application of patent application entitled, "PROJECTED ARTIFICIAL MAGNETIC MIRROR", having a filing date of Feb. 25, 2011, and a serial number of Ser. No. 13/034,957, which claims priority under 35 USC §119(e) to a provisionally filed patent application entitled, "PROJECTED ARTIFICIAL MAGNETIC MIRROR", having a provisional filing date of Apr. 11, 2010, and a provisional serial number of 61/322,873.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly to antenna structures used in such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems to radio frequency radar systems. Each type of communication system is constructed, and hence operates, in accordance with one or more communication standards. For instance, radio frequency (RF) wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), WCDMA, local multi-point distribution systems (LMDS), multi-channel-multi-point distribution systems (MMDS), LTE, WiMAX, and/or variations thereof. As another example, infrared (IR) communication systems may operate in accordance with one or more standards including, but not limited to, IrDA (Infrared Data Association).

For an RF wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). The receiver is coupled to the antenna and includes a low noise amplifier, one or more intermediate frequency stages, a filtering stage, and a data recovery stage. The transmitter includes a data modulation stage, one or more intermediate frequency stages, and a power amplifier, which is coupled to the antenna.

Since a wireless communication begins and ends with the antenna, a properly designed antenna structure is an important component of wireless communication devices. As is known, the antenna structure is designed to have a desired impedance (e.g., 50 Ohms) at an operating frequency, a desired bandwidth centered at the desired operating frequency, and a desired length (e.g., ¼ wavelength of the operating frequency for a monopole antenna). As is further known, the antenna structure may include a single monopole or dipole antenna, a diversity antenna structure, an antenna array having the same polarization, an antenna array having different polarization, and/or any number of other electromagnetic properties.

Two-dimensional antennas are known to include a meandering pattern or a micro strip configuration. For efficient antenna operation, the length of an antenna should be ¼ wavelength for a monopole antenna and ½ wavelength for a dipole antenna, where the wavelength $(\lambda)=c/f$, where c is the speed of light and f is frequency. For example, a ¼ wavelength antenna at 900 MHz has a total length of approximately 8.3 centimeters (i.e., $0.25*(3\times10^8 \text{ m/s})/(900\times10^6 \text{ c/s})=0.25*33$ cm, where m/s is meters per second and c/s is cycles per second). As another example, a ¼ wavelength antenna at 2400 MHz has a total length of approximately 3.1 cm (i.e., $0.25*(3\times10^8 \text{ m/s})/(2.4\times10^9 \text{ c/s})=0.25*12.5$ cm).

While two-dimensional antennas provide reasonably antenna performance for many wireless communication devices, there are issues when the wireless communication devices require full duplex operation and/or multiple input and/or multiple output (e.g., single input multiple output, multiple input multiple output, multiple input single output) operation. For example, for full duplex wireless communications to work reasonably well, received RF signals must be isolated from transmitted RF signals (e.g., >20 dBm). One popular mechanism is to use an isolator. Another popular mechanism is to use duplexers.

BRIEF DESCRIPTION OF THE SEVERAL VIEWS OF THE DRAWING(S)

FIG. 3 is an isometric diagram of an embodiment of a three-dimensional antenna assembly in accordance with the present invention;

FIG. 4 is an isometric diagram of another embodiment of a three-dimensional antenna assembly in accordance with the present invention;

FIG. 5 is a schematic block diagram of an embodiment of a three-dimensional antenna assembly in accordance with the present invention;

FIG. 13 is a diagram of an embodiment of a programmable artificial magnetic mirror (AMM) cell in accordance with the present invention;

FIG. 14 is a schematic block diagram of an embodiment of a programmable artificial magnetic mirror (AMM) cell in accordance with the present invention;

FIG. 15 is a diagram of another embodiment of a programmable artificial magnetic mirror (AMM) cell in accordance with the present invention;

FIG. 16 is a schematic block diagram of another embodiment of a programmable artificial magnetic mirror (AMM) cell in accordance with the present invention;

FIG. 17 is a diagram of another embodiment of a programmable circuit in accordance with the present invention;

FIG. 18 is an isometric diagram of another embodiment of a three-dimensional antenna assembly in accordance with the present invention;

FIG. 19 is an isometric diagram of another embodiment of a three-dimensional antenna assembly in accordance with the present invention;

DETAILED DESCRIPTION OF THE INVENTION

Figure 1:
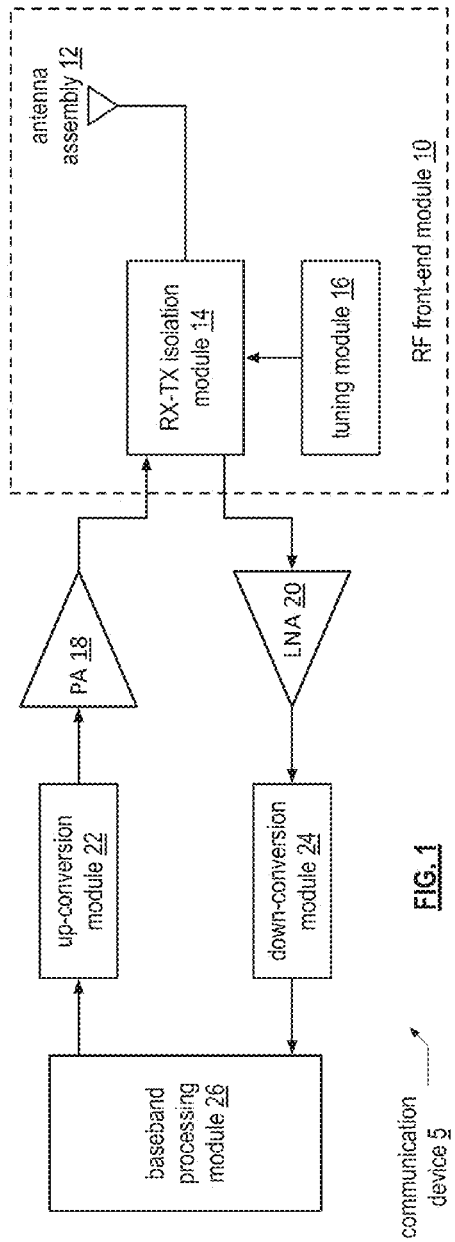
FIG. 1 is a schematic block diagram of an embodiment of a wireless communication device in accordance with the present invention.

FIG. 1 is a schematic block diagram of an embodiment of a wireless communication device 5 that includes a radio frequency (RF) front-end module 10, a power amplifier 18, a low noise amplifier 20, an up-conversion module 22, a down-conversion module 24, and a baseband processing module 26. The RF front-end module 10 includes a three-dimensional (3D) antenna assembly 12, a receive-transmit (RX-TX) isolation module 14, and a tuning module 16.

The communication device 5 may be any device that can be carried by a person, can be at least partially powered by a battery, includes a radio transceiver (e.g., radio frequency (RF) and/or millimeter wave (MMW)) and performs one or more software applications. For example, the communication device 5 may be a cellular telephone, a laptop computer, a personal digital assistant, a video game console, a video game player, a personal entertainment unit, a tablet computer, etc.

In an example of transmitting an outbound RF signal, the baseband processing module 26 converts outbound data (e.g., voice, text, video, graphics, video file, audio file, etc.) into one or more streams of outbound symbols in accordance with a communication standard, or protocol. The up-conversion module 22, which may be a direct conversion module or a super heterodyne conversion module, converts the one or more streams of outbound symbols into one or more up-converted signals. The power amplifier 18 amplifies the one or more up-converted signals to produce one or more outbound RF signals. The RX-TX isolation module 14 isolates the outbound RF signal(s) from inbound RF signal(s) and provides the outbound RF signal(s) to the 3D antenna assembly 12 for transmission. Note that the tuning module 16 tunes the RX-TX isolation module 14.

In an example of receiving one or more inbound RF signals, the 3D antenna assembly 12 receives the inbound RF signal(s) and provides them to the RX-TX isolation module 14. The RX-TX isolation module 14 isolates the inbound RF signal(s) from the outbound RF signal(s) and provides the inbound RF signal(s) to the low noise amplifier 20. The low noise amplifier 20 amplifies the inbound RF signal(s) and the down-conversion module 24, which may be a direct down conversion module or a super heterodyne conversion module, converts the amplified inbound RF signal(s) into one or more streams of inbound symbols. The baseband processing module 26 converts the one or more streams of inbound symbols into inbound data.

The RF front-end module 10 may be implemented as an integrated circuit (IC) that includes one or more IC dies and an IC package substrate. The tuning module 16 is implemented on the one or more IC dies. The IC package substrate supports the IC die(s) and may further include the 3D antenna assembly 12, or a portion thereof. The RX-TX isolation module 14 may be implemented on the one or more IC dies and/or on the IC package substrate. One or more of the power amplifier 18, the low noise amplifier 20, the up-conversion module 22, the down-conversion module 24, and the baseband processing module 26 may be implemented on the one or more IC dies.

Figure 2:
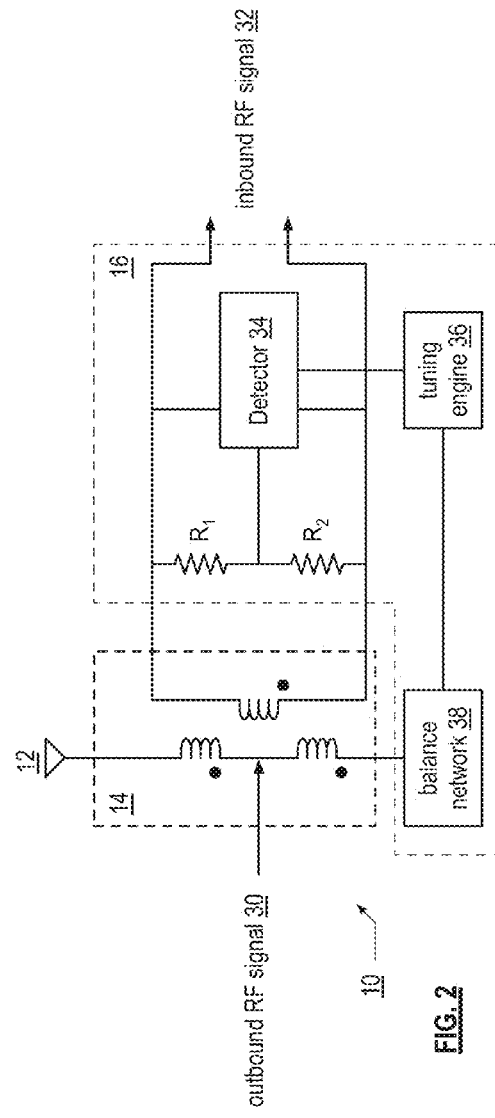
FIG. 2 is a schematic block diagram of an embodiment of an RF front-end module in accordance with the present invention.

FIG. 2 is a schematic block diagram of an embodiment of an RF front-end module 10 that includes the 3D antenna assembly 12, a duplexer 14 and a balance network 38 as the RX-TX isolation module 14, and a resistor divider (R1 and R2), a detector 34, and a tuning engine 36 as the tuning module 16. The duplexer 14-1 ideally functions, with respect to the secondary winding, to add the voltage induced by the inbound RF signal on the two primary windings and to subtract the voltage induced by the outbound RF signal on the two primary windings such that no outbound RF signal is present on the secondary winding and that two times the inbound RF signal is present on the secondary winding. The balance network 38 adjusts its impedance based on feedback from the tuning module 16 to substantially match the impedance of the 3D antenna such that the duplexer functions more closely to ideal.

FIG. 3 is an isometric diagram of an embodiment of a three-dimensional antenna assembly 12 that includes a spiral antenna feed 40, a programmable circuit 42, and a substrate 44. The spiral antenna feed 40 includes a spiral antenna section 46 and a feed point 48 coupled to a connection point of the spiral antenna section 46. The substrate 44, which may be one or more printed circuit boards, one or more integrated circuit package substrates, and/or a non-conductive fabricated antenna backing structure, includes an external three-dimension shaped region 42 (e.g., extends beyond the surface, or a perimeter, of the substrate 44) on which the spiral antenna feed 40 resides. The spiral antenna sections 46 are supported by and, collectively, conform to the three-dimensional shaped region 50 such that the spiral antenna sections 46 have an overall shape approximating a three-dimensional shape.

For example, when the three-dimensional shaped region 50 has a hyperbolic shape, the spiral antenna section 46 has a shape that corresponds to the hyperbolic shape and is about the same size as the three-dimensional shaped region 50. As a further example, the substrate 44 may be a non-conductive fabricated antenna backing structure (e.g., plastic, glass, fiberglass, etc.) that is encompassed by the 3D shaped region 50 to provide a hyperbolic shaped antenna. The diameter of the hyperbolic shape may range from micrometers for high frequency (e.g., tens of gigi-hertz) and/or low power applications to tens of meters for lower frequency and/or higher power applications.

As another example, the three-dimensional shaped region 50 has a conical shape and the spiral antenna section 46 has a shape that corresponds to the conical shape and is about the same size as the three-dimensional shaped region 50. The three-dimensional shaped region 50 may have other shapes, such as a cup shape, a cylindrical shape, a pyramid shape, a box shape (as shown in FIG. 3), a spherical shape, or a parabolic shape.

FIG. 4 is an isometric diagram of another embodiment of a three-dimensional antenna assembly 12 that includes the spiral antenna feed 40, the programmable circuit 42, and the substrate 44. The spiral antenna feed 40 includes a spiral antenna section 46 and a feed point 48 coupled to a connection point of the spiral antenna section 46. The substrate 44, which may be one or more printed circuit boards, one or more integrated circuit package substrates, and/or a non-conductive fabricated antenna backing structure, includes an internal three-dimension shaped region 52 (e.g., extends inward with respect to the surface or outer edge of the substrate 44), which supports the spiral antenna feed 40. The spiral antenna section 46 is supported by and conforms to the three-dimensional shaped region 52 such that the spiral antenna section 46 has an overall shape approximating a three-dimensional shape. The three-dimensional shaped region 52 may have a cup shape, a parabolic shape, a conical shape, a box shape (as shown in FIG. 4), a cylindrical shape, a pyramid shape, or a spherical shape.

FIG. 5 is a schematic block diagram of an embodiment of a three-dimensional antenna assembly 12 that includes the spiral antenna feed 40 and the programmable circuit 42. The programmable circuit 42 creates a projected artificial magnetic conductor (AMC) reflector dish 54. The spiral antenna feed 40 includes the spiral antenna element 46 and the feed point 48 on a 3D region 50 or 52 of the substrate 44.

In an example of operation, the programmable circuit 42 generates the projected AMC dish 54 at a distance above the surface of the programmable circuit and with a given orientation. As shown, the orientation may be changed with respect to the spiral antenna feed 40 to direct the reflection of RF signals to and/or from a given direction. For instance, with the grey-shaded orientation of the projected AMC dish 54, the dish 54 reflects outbound RF signals transmitted by the spiral antenna feed 50 in the direction shown. For inbound RF signals, the projected AMC dish 54 reflects the inbound RF signals as shown to the spiral antenna feed 40. As the orientation of the dish 54 is changed, the direction of reflection is changed accordingly.

FIGS. 6-9 are diagrams of embodiments of the spiral antenna section 46 that includes one or more turn spiral shape. The spiral shape may be an Archimedean spiral shape and/or an equiangular spiral shape (e.g., Celtic spiral). Due to the spiral nature of the spiral antenna section 46 the antenna has a gain of approximately 3 dB (e.g., a spiral gain component) as a result of the opposite radiation lobe being inverted, which doubles the forward radiation pattern energy. The gain of the antenna section 46 is further increased by approximately 2 dB due to the three-dimensional shape of the antenna section 46 (e.g., a three-dimensional gain component). As such, the 3D antenna assembly 12 has approximately a 5 dB gain and combined power from each of the spiral antenna sections 46.

The frequency band of operation of the 3D antenna assembly 12 is based, at least in part, on the physical attributes of the antenna 12. For instance, the dimensions of the excitation region of the spiral antenna section 46 (i.e., the feed point and/or the radius of the inner turn) establish an upper cutoff region of the bandwidth and the circumference of the spiral antenna section 46 establishes a lower cutoff region of the bandwidth. The spiral pattern creates a circular polarization. The trace width, distance between traces, length of the spiral section 46, distance to a ground plane, and/or use of an artificial magnetic conductor plane affect the quality factor, radiation pattern, impedance (which is fairly constant over the bandwidth), gain, and/or other characteristics of the antenna 12.

Figure 6:
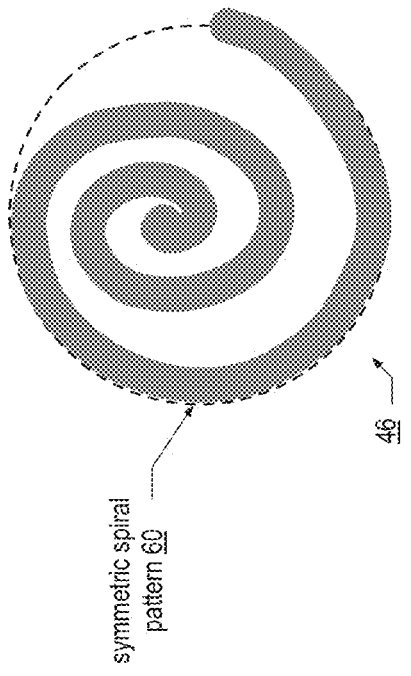
FIG. 6 is a cross sectional view diagram of an embodiment of a three-dimensional multiple spiral antenna in accordance with the present invention.
Figure 7:
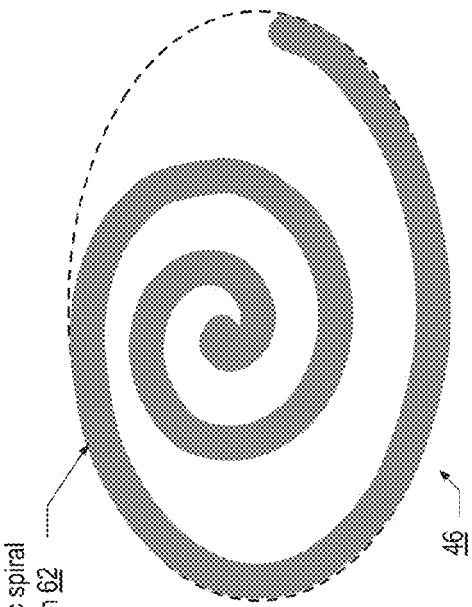
FIG. 7 is a cross sectional view diagram of an embodiment of a three-dimensional multiple spiral antenna in accordance with the present invention.
Figure 8:
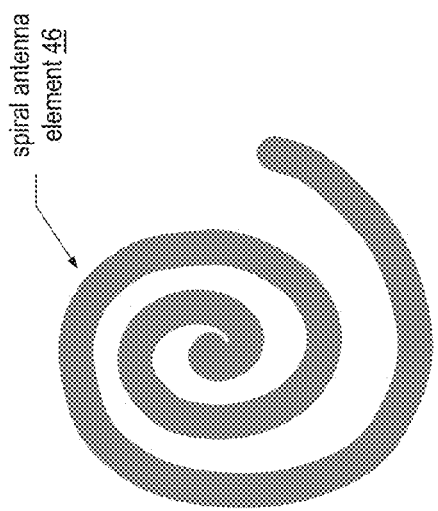
FIG. 8 is a diagram of an embodiment of a spiral antenna element in accordance with the present invention.
Figure 9:
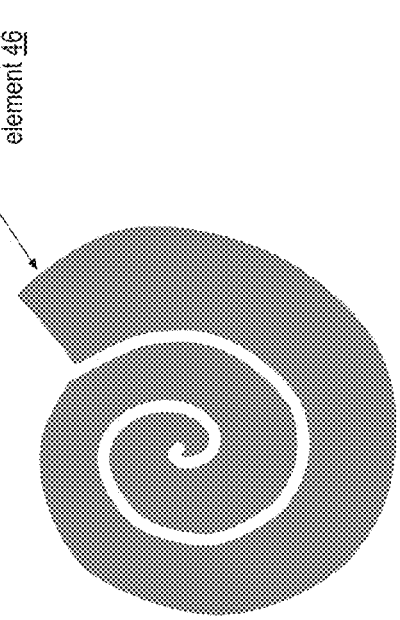
FIG. 9 is a diagram of another embodiment of a spiral antenna element in accordance with the present invention.

As shown in FIG. 6, the spiral antenna section 46 includes a conductive wire formed as a multiple turn spiral. The length, width, and distance between the turns are dictated by the desired characteristics of the antenna section (e.g., bandwidth, center frequency, quality factor, impedance, polarization, etc.). FIG. 7 illustrates the spiral antenna section 46 including a substantially solid conducive material with a multiple turn spiral slot. FIG. 8 illustrates the spiral antenna section 46 including the conductive wire or the substantially solid conductor implementation having a symmetrical spiral pattern 60, which creates a radiation pattern that is substantially perpendicular to the feed point. FIG. 9 illustrates the spiral antenna section 46 including the conductive wire or the substantially solid conductor implementation having an eccentric spiral pattern 62, which creates a radiation pattern that is not perpendicular to the feed point.

Figure 10:
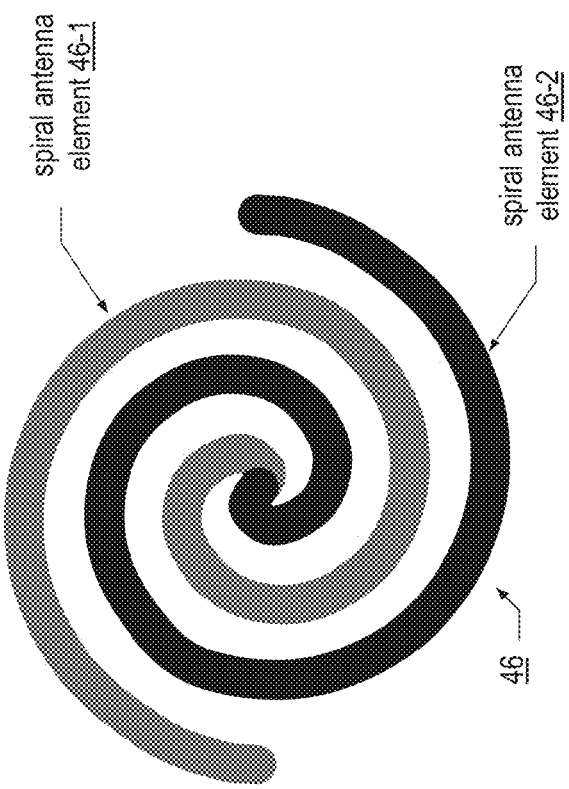
FIG. 10 is a diagram of another embodiment of a spiral antenna element in accordance with the present invention.

FIG. 10 is a diagram of an embodiment of a spiral antenna section 46 including interwoven spiral antenna elements 46-1 and 46-2. Each of the spiral antenna elements 46-1 and 46-2 may have an Archimedean spiral shape or an equiangular spiral shape. Further, each of the spiral antenna elements may have a symmetric spiral pattern or an eccentric spiral pattern. Still further, each of the spiral antenna elements may include a conductive wire formed as a multiple turn spiral.

Due to the spiral nature of the interwoven spiral antenna elements 46-1 and 46-2, the antenna section 46 has a gain of approximately 3 dB (e.g., a spiral gain component) as a result of the opposite radiation lobe being inverted, thus doubling the forward radiation pattern energy. The gain of the antenna 12 is further increased by approximately 2 dB due the three-dimensional shape of the antenna section (e.g., a three-dimensional gain component). As such, the 3D antenna assembly 12 has approximately a 5 dB gain.

The frequency band of operation of the 3D antenna assembly 12 is based, at least in part, on the physical attributes of the antenna section 46. For instance, the dimensions of the excitation region of the spiral antenna section 46 (i.e., the feed point and/or the radius of the inner turn) establish an upper cutoff region of the bandwidth and the circumference of the spiral antenna section 46 establishes a lower cutoff region of the bandwidth. The interwoven spiral pattern creates a circular polarization. The trace width, distance between traces, length of each spiral section, distance to a ground plane, and/or use of an artificial magnetic conductor plane affect the quality factor, radiation pattern, impedance (which is fairly constant over the bandwidth), gain, and/or other characteristics of the antenna 12.

In a specific example, a 20 mm radius (e.g., 2*π*20=125.66 mm circumference) of a spiral antenna section 46 provides a low frequency cutoff of approximately 2 GHz and an excitation region with a radius of approximately 5 mm establishes a high frequency cutoff of approximately 8 GHz. As such, this specific example antenna 12 has a bandwidth of 2-8 GHz, centered at 5 GHz with the combined power for the spiral antenna sections 46.

Figure 11:
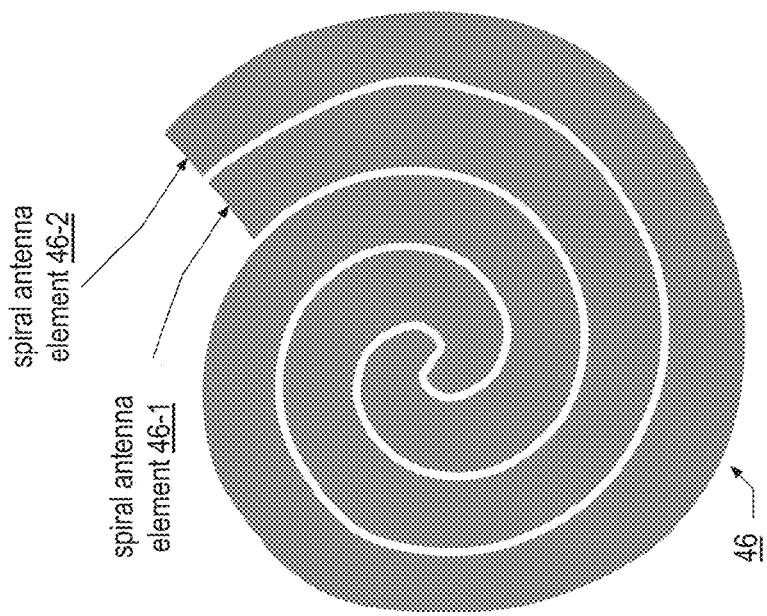
FIG. 11 is a diagram of another embodiment of a spiral antenna element in accordance with the present invention.

FIG. 11 is a diagram of another embodiment of a spiral antenna section 46 including a first spiral antenna element 46-1 interwoven with a second spiral antenna element 46-2. Each of the first and second spiral antenna elements 46-1 and 46-2 may have an Archimedean spiral shape or an equiangular spiral shape. Further, each of the first and second spiral antenna elements may have a symmetric spiral pattern or an eccentric spiral pattern. Still further, the interwoven spiral antenna elements 46-1 and 46-2 may be a substantially solid conducive material, wherein a multiple turn spiral slot separates the first and second spiral antenna elements 46-1 and 46-2.

Figure 12:
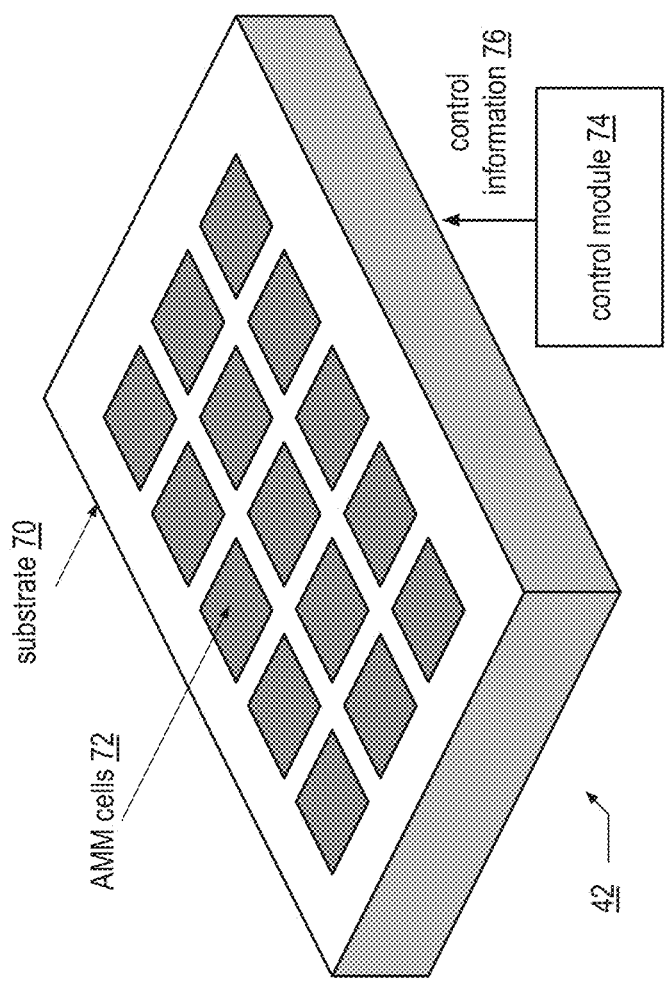
FIG. 12 is a diagram of an embodiment of a programmable circuit in accordance with the present invention.

FIG. 12 is a diagram of an embodiment of a programmable circuit 42 that includes a second substrate 70 (e.g., another layer on the substrate 44 or a different substrate), a plurality of artificial magnetic mirror (AMM) cells 72 on the substrate 70, and a control module 74. The AMM cells 72 collectively produce an artificial magnetic conductor (AMC) as the projected artificial magnetic conductor reflector dish 54 at a distance from a surface of the second substrate for the inbound and outbound RF signals in a given frequency range. The control module 74 generates control information 76 and provides it to one or more of the AMM cells 72 to tune the dish shape of the AMC and/or the distance of the AMC from the surface of the second substrate.

FIG. 13 is a diagram of an embodiment of a programmable artificial magnetic mirror (AMM) cell 72 formed on the substrate 70. The programmable AMM cell 72 includes a spiral coil conductive element 80, an impedance element 82, and a ground plane 84. The impedance element 82 includes one or more variable capacitors and/or variable inductors, wherein the control information 76 selects a particular impedance for the impedance element 82. As the impedance of the impedance element 82 varies, the AMC properties of the coil changes.

FIG. 14 is a schematic block diagram of an embodiment of a programmable artificial magnetic mirror (AMM) cell of FIG. 13. As shown, the coil 80 is represented as a lumped resistor-inductor-capacitor (RLC) circuit 85 and the impedance element 82 is shown as a variable impedance circuit (Z), which is coupled to the RLC circuit 85 as shown.

FIG. 15 is a diagram of another embodiment of a programmable artificial magnetic mirror (AMM) cell 72 formed on the substrate 70. The programmable AMM cell 72 includes a spiral coil conductive element 80, an impedance element 82, and a ground plane 84. The impedance element 82 includes one or more variable capacitors and/or variable inductors, wherein the control information 76 selects a particular impedance for the impedance element 82. As the impedance of the impedance element 82 varies, the AMC properties of the coil changes.

FIG. 16 is a schematic block diagram of another embodiment of a programmable artificial magnetic mirror (AMM) cell of FIG. 13. As shown, the coil 80 is represented as a lumped resistor-inductor-capacitor (RLC) circuit 85 and the impedance element 82 is shown as a variable impedance circuit (Z), which is coupled in parallel to the RLC circuit 85.

FIG. 17 is a diagram of another embodiment of a programmable circuit 42 a programmable substrate that includes a substrate 90 and a metamorphic layer 92. The substrate 90 includes inclusions 94, which may be non-magnetic metallodielectric inclusions and/or high permittivity metallodielectric inclusions. The inclusions provide a base permittivity, permeability, and/or conductivity characteristics of the programmable substrate. The metamorphic layer 92 is proximal to the second substrate 90 and includes one or more variable impedance circuits 98 that tune based on the control information 76, in a region of the second substrate, the base permittivity, permeability, and/or conductivity characteristics to provide desired permittivity, permeability, and/or conductivity characteristics of the programmable substrate. By controlling the permittivity, permeability, and/or conductivity characteristics of the programmable substrate the shape, distance from the surface, and/or orientations of the projected artificial magnetic conductor reflector dish 54 can be adjusted.

The functioning of the programmable circuit and of the programmable AMM cells is further described in pending patent application entitled "Artificial Magnetic Mirror Cell and Applications Thereof", having a filing date of Aug. 13, 2012, a Ser. No. 13/600,033. The functioning of the programmable substrate is further described in pending patent application entitled "Programmable Substrate and Applications Thereof", having a filing date of Aug. 30, 2012, a Ser. No. 13/600,087. Both applications are incorporated in their entirety by reference.

FIG. 18 is an isometric diagram of an embodiment of a three-dimensional antenna assembly 12 that includes a spiral antenna feed 100, a programmable circuit 42, and a substrate 44. The spiral antenna feed 100 includes spiral antenna sections 46 and a feed point 48 coupled to one or more connection points of the spiral antenna sections 46. The substrate 44 includes an external three-dimension shaped region 50 that supports the spiral antenna sections 46 such that the spiral antenna sections 46 collectively have an overall shape approximating a three-dimensional shape. The three-dimensional shape may be a hyperbolic shape, a parabolic shape, a conical shape, a cup shape, a cylindrical shape, a pyramid shape, a box shape (as shown in FIG. 18), a spherical shape, or a parabolic shape.

FIG. 19 is an isometric diagram of another embodiment of a three-dimensional antenna assembly 12 that includes the spiral antenna feed 100, the programmable circuit 42, and the substrate 44. The spiral antenna feed 100 includes the spiral antenna sections 46, and the feed point 48. The substrate 44 includes an internal three-dimension shaped region 52 that supports the spiral antenna sections 46 such that, collectively, the spiral antenna sections 46 have an overall shape approximating a three-dimensional shape. The three-dimensional shaped region 52 may have a cup shape, a parabolic shape, a conical shape, a box shape (as shown in FIG. 19), a cylindrical shape, a pyramid shape, or a spherical shape.

Figure 20:
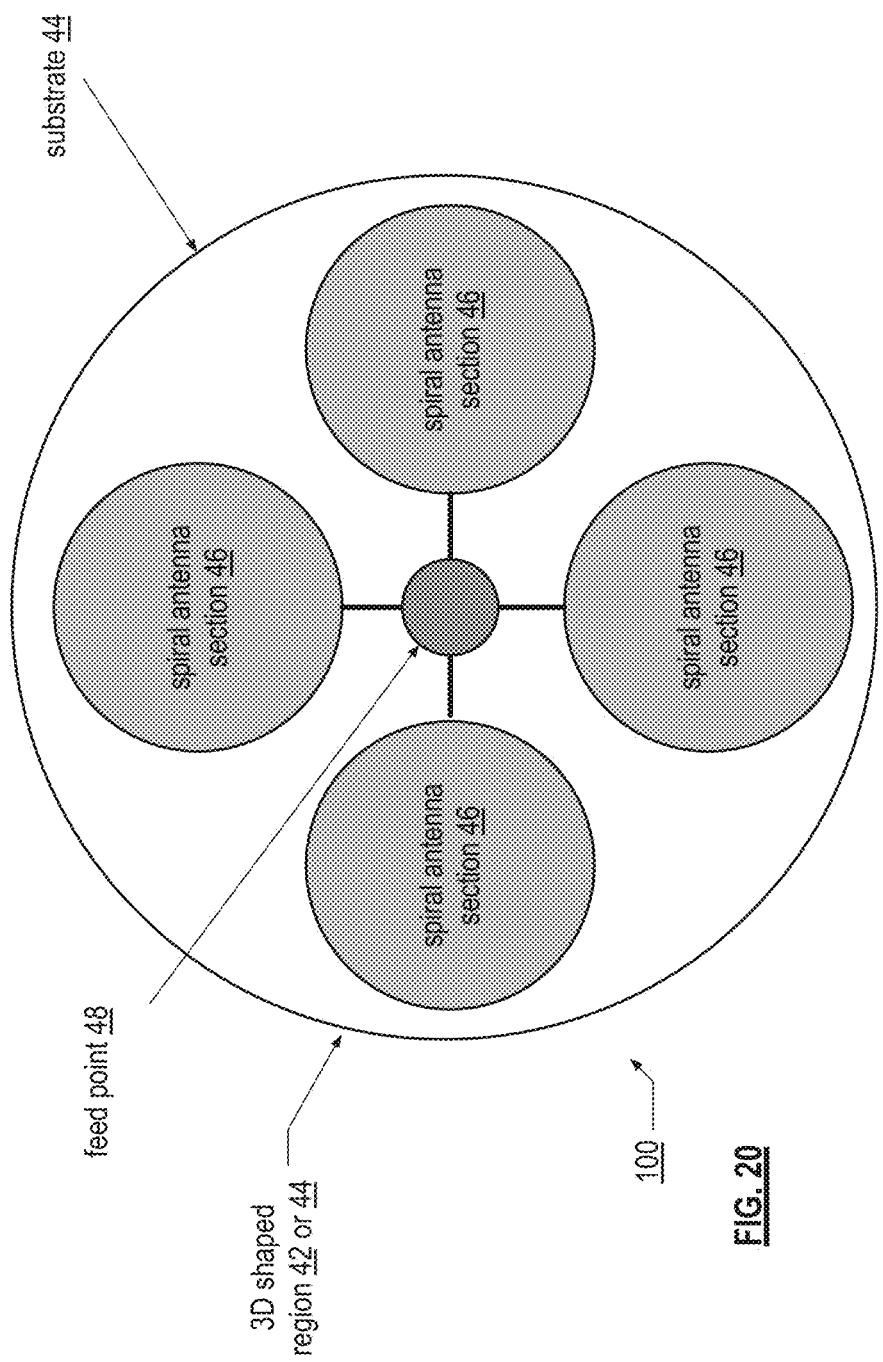
FIG. 20 is a schematic block diagram of an embodiment of a spiral antenna feed in accordance with the present invention.

FIG. 20 is a schematic block diagram of an embodiment of a spiral antenna feed 100 that includes four spiral antenna sections 46 coupled to a feed point 48 on the substrate 44. In this example, the substrate 44 has a parabolic or a hyperbolic shape. Each of the spiral antenna sections 46 is attached (e.g., implemented, affixed, adhered, embedded, encased, etc.) to a region of the substrate and has a shape corresponding to the region of the substrate. For instance, if the substrate 44 is divided into four regions, each a quarter of the hyperbolic or parabolic shape, then each region has a quarter hyperbolic or parabolic shape. Accordingly, each spiral antenna section 46 has a quarter hyperbolic or quarter parabolic shape.

Each of the sections 46 may include one or more spiral antenna elements; examples of which were discussed with reference to one or more of FIGS. 6-11. The feed point 48 may be implemented in a variety of ways depending on the desired power combining of the 3D multiple spiral antenna 12. For example, if the desired power combining is a parallel power combining, the feed point 48 includes transmission line connections and a common feed point. As another example, if the desired power combining is a serial power combining, the feed point 48 includes a phase generator, connections traces, and individual feed points for each of the spiral antenna sections 46.

While the present example illustrates four spiral antenna sections 46, the 3D multiple spiral antenna 12 may include more or less than four spiral antenna sections. For instance, and as shown in FIGS. 14 and 15, the 3D multiple spiral antenna 12 includes three spiral antenna sections 46.

Figure 21:
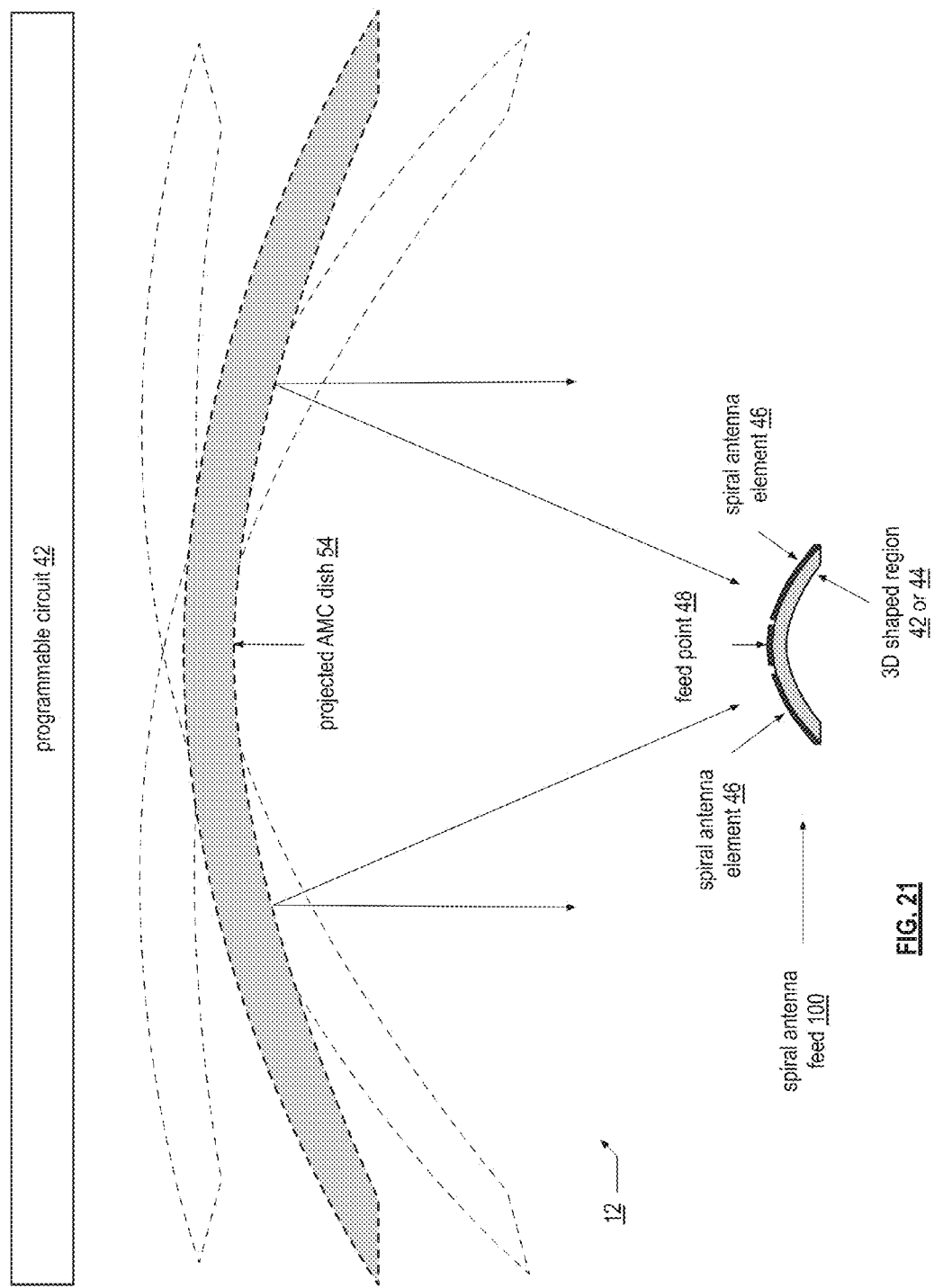
FIG. 21 is an isometric diagram of another embodiment of a three-dimensional antenna assembly in accordance with the present invention.

FIG. 21 is an isometric diagram of another embodiment of a three-dimensional antenna assembly 12 that includes the spiral antenna feed 100 and the programmable circuit 42. The programmable circuit 42 creates a projected artificial magnetic conductor (AMC) reflector dish 54. The spiral antenna feed 100 includes spiral antenna elements 46 and the feed point 48 on a 3D region 50 or 52 of the substrate 44.

In an example of operation, the programmable circuit 42 generates the projected AMC dish 54 at a distance above the surface of the programmable circuit and with a given orientation. As shown, the orientation may be changed with respect to the spiral antenna feed 100 to direct the reflection of RF signals to and/or from a given direction. For instance, with the grey-shaded orientation of the projected AMC dish 54, the dish 54 reflects outbound RF signals transmitted by the spiral antenna feed 100 in the direction shown. For inbound RF signals, the projected AMC dish 54 reflects the inbound RF signals as shown to the spiral antenna feed 40. As the orientation of the dish 54 is changed, the direction of reflection is changed accordingly.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An antenna assembly comprises:
   a spiral antenna feed that includes:
      a substrate having a three-dimensional hyperbolic shaped region;
      a spiral antenna element supported by and conforming to the three-dimensional hyperbolic shaped region such that the spiral antenna element has an overall shape approximating a three-dimensional hyperbolic shape; and
      a feed point coupled to a connection point of the spiral antenna element; and
   a programmable circuit operable to produce a projected artificial magnetic conductor reflector dish that:
      reflects an inbound RF signal to the spiral antenna feed; and
      reflects an outbound RF signal transmitted by the spiral antenna feed.

2. The antenna assembly of claim 1 further comprises:
   a second spiral antenna element interwoven with the spiral antenna element, wherein each of the spiral antenna element and the second spiral antenna element, has an Archimedean symmetric spiral shape, an Archimedean eccentric spiral shape, an equiangular symmetric spiral shape, or a equiangular eccentric spiral shape.

3. The antenna assembly of claim 1, wherein the programmable circuit comprises:
   a second substrate;
   a plurality of artificial magnetic mirror (AMM) cells on the substrate, wherein the plurality of AMM cells collectively produce an artificial magnetic conductor (AMC) as the projected artificial magnetic conductor reflector dish at a distance from a surface of the second substrate for the inbound and outbound RF signals in a given frequency range; and
   a control module operably coupled to the plurality of AMM cells, wherein the control module provides control information to one or more of the plurality of AMM cells to tune at least one of the dish shape of the AMC and the distance of the AMC from the surface of the second substrate.

4. The antenna assembly of claim 1, wherein the programmable circuit comprises:
   a programmable substrate that includes:
      a second substrate;
      substrate inclusions embedded within the second substrate, wherein the substrate inclusions provide base permittivity, permeability, and conductivity characteristics of the programmable substrate; and
      a metamorphic layer proximal to the second substrate, wherein the metamorphic layer includes one or more variable impedance circuits that tune, in a region of the second substrate, the base permittivity, permeability, and conductivity characteristics to provide desired permittivity, permeability, and conductivity characteristics of the programmable substrate to create the projected artificial magnetic conductor reflector dish.

5. The antenna assembly of claim 1, wherein the spiral antenna element comprises one of:
   a substantially solid conducive material with a multiple turn spiral slot; and
   a conductive wire formed as a multiple turn spiral, wherein a lower end of a frequency band of the antenna assembly is based on a radius of the spiral antenna element.

6. The antenna assembly of claim 1, wherein the substrate comprises one of:
   one or more printed circuit boards;
   one or more integrated circuit package substrates; and
   an non-conductive fabricated antenna backing structure.

7. An antenna assembly comprises:
   a spiral antenna feed that includes:
      a substrate having a three-dimensional hyperbolic shaped region;
      a plurality of spiral antenna sections, wherein each spiral antenna section of the plurality of spiral antenna sections is supported by a corresponding section of the three-dimensional hyperbolic shaped region and conforms to the corresponding section of the three-dimensional hyperbolic shaped region such that, collectively, the plurality of spiral antenna sections has an overall shape approximating a three-dimensional hyperbolic shape; and a feed point coupled to a connection point of at least one of the plurality of spiral antenna sections; and a programmable circuit operable to produce a projected artificial magnetic conductor reflector dish that:
reflects an inbound RF signal to the three-dimensional spiral antenna feed; and
reflects an outbound RF signal transmitted by the three-dimensional spiral antenna feed.

8. The antenna assembly of claim 7, wherein a spiral antenna section of the plurality of spiral antenna section comprises:
a spiral antenna element having an Archimedean symmetric spiral shape, an Archimedean eccentric spiral shape, an equiangular symmetric spiral shape, or an equiangular eccentric spiral shape.

9. The antenna assembly of claim 8, wherein the spiral antenna element comprises one of:
a substantially solid conducive material with a multiple turn spiral slot; and
a conductive wire formed as a multiple turn spiral, wherein a lower end of a frequency band of the three-dimensional multiple spiral antenna is based on a radius of the plurality of spiral antenna sections having the overall shape approximating the three-dimensional shape.

10. The antenna assembly of claim 8, wherein the spiral antenna section further comprises:
a second spiral antenna element interwoven with first spiral antenna element, wherein the second spiral antenna element has the Archimedean symmetric spiral shape, the Archimedean eccentric spiral shape, the equiangular symmetric spiral shape, or the equiangular eccentric spiral shape.

11. The antenna assembly of claim 7, wherein the programmable circuit comprises:
a second substrate;
a plurality of artificial magnetic mirror (AMM) cells on the substrate, wherein the plurality of AMM cells collectively produce an artificial magnetic conductor (AMC) as the projected artificial magnetic conductor reflector dish at a distance from a surface of the second substrate for the inbound and outbound RF signals in a given frequency range; and
a control module operably coupled to the plurality of AMM cells, wherein the control module provides control information to one or more of the plurality of AMM cells to tune at least one of the dish shape of the AMC and the distance of the AMC from the surface of the second substrate.

12. The antenna assembly of claim 7, wherein the projected artificial magnetic conductor reflector dish comprises:
a programmable substrate that includes:
a second substrate;
substrate inclusions embedded within the second substrate, wherein the substrate inclusions provide base permittivity, permeability, and conductivity characteristics of the programmable substrate; and
a metamorphic layer proximal to the second substrate, wherein the metamorphic layer includes one or more variable impedance circuits that tune, in a region of the second substrate, the base permittivity, permeability, and conductivity characteristics to provide desired permittivity, permeability, and conductivity characteristics of the programmable substrate to create the projected artificial magnetic conductor reflector dish.

13. The antenna assembly of claim 7, wherein the substrate comprises one of:
one or more printed circuit boards;
one or more integrated circuit package substrates; and
an non-conductive fabricated antenna backing structure.

14. A radio frequency (RF) front-end module comprises:
an antenna assembly that includes:
a hyperbolic shaped spiral antenna feed; and
a programmable circuit operable to produce a projected artificial magnetic conductor reflector dish that:
reflects an inbound RF signal to the hyperbolic shaped spiral antenna feed; and
reflects an outbound RF signal transmitted by the hyperbolic shaped spiral antenna feed;
a receive-transmit isolation module operably coupled to the antenna assembly, wherein the receive-transmit isolation module is operable to isolate the inbound RF signal and the outbound RF signal; and
a tuning module operable to tune the receive-transmit isolation module.

15. The RF front-end module of claim 14, wherein the hyperbolic shaped spiral antenna feed comprises:
a substrate having a three-dimensional hyperbolic shaped region;
a spiral antenna element supported by and conforming to the three-dimensional hyperbolic shaped region such that the spiral antenna element has an overall shape approximating a three-dimensional hyperbolic shape; and
a feed point coupled to a connection point of the spiral antenna element.

16. The RF front-end module of claim 15, wherein the spiral antenna element comprises one of:
a substantially solid conducive material with a multiple turn spiral slot; and
a conductive wire formed as a multiple turn spiral, wherein a lower end of a frequency band of the antenna assembly is based on a radius of the spiral antenna element.

17. The RF front-end module of claim 14, wherein the hyperbolic shaped spiral antenna feed comprises:
a substrate having a three-dimensional hyperbolic shaped region;
a plurality of spiral antenna sections, wherein each spiral antenna section of the plurality of spiral antenna sections is supported by a corresponding section of the three-dimensional hyperbolic shaped region and conforms to the corresponding section of the three-dimensional hyperbolic shaped region such that, collectively, the plurality of spiral antenna sections has an overall shape approximating a three-dimensional hyperbolic shape; and
a feed point coupled to a connection point of at least one of the plurality of spiral antenna sections.

18. The RF front-end module of claim 17, wherein a spiral antenna section of the plurality of spiral antenna section comprises:
a spiral antenna element having an Archimedean symmetric spiral shape, an Archimedean eccentric spiral shape, an equiangular symmetric spiral shape, or an equiangular eccentric spiral shape.

19. The RF front-end module of claim 14, wherein the programmable circuit comprises:
a second substrate;
a plurality of artificial magnetic mirror (AMM) cells on the substrate, wherein the plurality of AMM cells collectively produce an artificial magnetic conductor (AMC) as the projected artificial magnetic conductor reflector dish at a distance from a surface of the second substrate for the inbound and outbound RF signals in a given frequency range; and a control module operably coupled to the plurality of AMM cells, wherein the control module provides control information to one or more of the plurality of AMM cells to tune at least one of the dish shape of the AMC and the distance of the AMC from the surface of the second substrate.

20. The RF front-end module of claim 14, wherein the projected artificial magnetic conductor reflector dish comprises:

a programmable substrate that includes:
   a second substrate;
   substrate inclusions embedded within the second substrate, wherein the substrate inclusions provide base permittivity, permeability, and conductivity characteristics of the programmable substrate; and
   a metamorphic layer proximal to the second substrate, wherein the metamorphic layer includes one or more variable impedance circuits that tune, in a region of the second substrate, the base permittivity, permeability, and conductivity characteristics to provide desired permittivity, permeability, and conductivity characteristics of the programmable substrate to create the projected artificial magnetic conductor reflector dish.

* * * * *